(12) United States Patent
Xie

(10) Patent No.: US 10,048,533 B2
(45) Date of Patent: Aug. 14, 2018

(54) LIQUID CRYSTAL DISPLAY AND TERMINAL

(71) Applicant: Wuhan China Star Optoelectronics Technology Co., Ltd., Wuhan, Hubei (CN)

(72) Inventor: Chang Xie, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 197 days.

(21) Appl. No.: 15/126,410

(22) PCT Filed: Jul. 27, 2016

(86) PCT No.: PCT/CN2016/091885
§ 371 (c)(1),
(2) Date: Sep. 15, 2016

(87) PCT Pub. No.: WO2017/219440
PCT Pub. Date: Dec. 28, 2017

(65) Prior Publication Data
US 2018/0196307 A1  Jul. 12, 2018

(30) Foreign Application Priority Data

Jun. 21, 2016  (CN) .......................... 2016 1 0447628

(51) Int. Cl.
*G02F 1/1339* (2006.01)
*G02F 1/1335* (2006.01)
*G02F 1/1362* (2006.01)
*G02F 1/133* (2006.01)

(52) U.S. Cl.
CPC .. *G02F 1/133528* (2013.01); *G02F 1/136286* (2013.01); *G02F 2001/13324* (2013.01)

(58) Field of Classification Search
CPC ......... G02F 1/133528; G02F 1/136286; G02F 2001/133524
USPC ............................... 349/81–84, 158
See application file for complete search history.

(56) References Cited

U.S. PATENT DOCUMENTS

| 5,498,904 A * | 3/1996 | Harata | .............. H01L 29/66757 117/923 |
| 2012/0291275 A1* | 11/2012 | Rha | ........................ H05K 3/107 29/846 |
| 2012/0305072 A1* | 12/2012 | Fujimori | ......... H01L 31/022441 136/256 |
| 2017/0017115 A1* | 1/2017 | Kim | .................... G02F 1/13439 |

* cited by examiner

*Primary Examiner* — Hoan C Nguyen
(74) *Attorney, Agent, or Firm* — Andrew C. Cheng

(57) ABSTRACT

The disclosure provides a liquid crystal display, including a liquid crystal cell, the liquid crystal cell includes a first substrate, a second substrate and a liquid crystal layer between the first substrate and the second substrate, the first substrate at least includes a transparent base, a metallic wiring disposed on the transparent base towards the liquid crystal layer and a first polarizer disposed on an external surface of the transparent base, the liquid crystal display further includes a solar cell disposed on the transparent base of the first substrate right below the metallic wiring, the first polarizer includes a hollow region revealing the transparent base, the solar cell shelters the hollow region.

20 Claims, 2 Drawing Sheets

US 10,048,533 B2

LIQUID CRYSTAL DISPLAY AND TERMINAL

CROSS REFERENCE TO RELATED APPLICATION

This disclosure claims priority to Chinese patent application No. 201610447628.5, entitled "LIQUID CRYSTAL DISPLAY AND TERMINAL" filed on Jun. 21, 2016, which is incorporated by reference in its entirety.

FIELD OF THE DISCLOSURE

The disclosure relates to a liquid crystal display technical field, and more particularly to a liquid crystal display and a terminal.

BACKGROUND OF THE DISCLOSURE

A liquid crystal display (LCD) is applied more and more widely on the market due to advantages such as portability, low power consumption and digitization. As liquid crystals cannot self-illuminate or be lit by natural light, a backlight source is required to be adopted for displaying stably and clearly. Generally, the backlight source is powered by an external battery, frequent charging is needed due to a limited capacity of the battery, which is inconvenient for a user. In a conventional technique, when light penetrates a substrate through a polarizer, an opaque metallic region blocks light, light from the backlight source is radiated to an aperture region of the substrate and the opaque metallic region simultaneously, light radiated to the aperture region of the substrate is utilized effectively, but light radiated to the opaque metallic region is totally sheltered due to the metallic layer, which is a waste. Low transmittance of each layer of a liquid crystal panel leads to poor transmittance of a conventional liquid crystal display, or in order to chase high transmittance, a high voltage needs to be loaded on the panel, so that power consumption of the liquid crystal display mentioned above is high, endurance of the battery is short, a range in application is restricted.

SUMMARY OF THE DISCLOSURE

To solve the technical problem, the disclosure provides a liquid crystal display and a terminal that utilize the light source thoroughly and save power consumption.

In order to achieve the objective above, the embodiment of the disclosure is as follows.

The application provides a liquid crystal display, including a liquid crystal cell. The liquid crystal cell includes a first substrate, a second substrate and a liquid crystal layer between the first substrate and the second substrate. The first substrate at least includes a transparent base, a metallic wiring disposed on the transparent base towards the liquid crystal layer and a first polarizer disposed on an external surface of the transparent base. The liquid crystal display further includes a solar cell disposed on the transparent base of the first substrate right below the metallic wiring. The first polarizer includes a hollow region revealing the transparent base. An orthographic projection of the solar cell covers the hollow region.

An orthographic projection of the hollow region on the transparent base and the orthographic projection of the solar cell on the transparent base completely coincide, or the orthographic projection of the hollow region on the transparent base is in the orthographic projection of the solar cell on the transparent base.

The metallic wiring includes a data line, a scanning line and a pixel electrode.

The first substrate further includes a storage capacitor or a thin film transistor in a pixel region. A position on the transparent base opposite to the thin film transistor is disposed with a first solar cell. A first hollow region is disposed on the first polarizer correspondingly to the first solar cell.

The first substrate includes an insulation layer applied to insulate electric connection between the solar cell and other components in the liquid crystal display.

The liquid crystal display further includes a frame. The frame is between the first substrate and the second substrate and sealing the liquid crystal layer. A second solar cell is disposed in the frame.

Circumference of the hollow region and circumference of the solar cell form a gap through the transparent base.

The liquid crystal display further includes a flexible circuit board connected to the liquid crystal cell. The solar cell and the flexible circuit board are connected electrically.

The liquid crystal display further includes a backlight module. The solar cell and the backlight module are connected electrically.

The application further provides a terminal, including the liquid crystal display described above.

The disclosure disposes a solar cell on the first substrate within the metallic wiring region and removes the section of the polarizer on the first substrate directly opposite to the solar cell to form the hollow region, the transmittance of light penetrating the transparent base in the gap is increased significantly to reduce the power consumption, the utilization rate of optical energy and the optical efficiency are improved, the power consumption of the display is reduced.

BRIEF DESCRIPTION OF THE DRAWINGS

In order to more clearly illustrate embodiments of the disclosure, following figures described in embodiments will be briefly introduced, it is obvious that the drawings are merely some embodiments of the disclosure, a person skilled in the art can obtain other figures according to these figures without creativity.

DETAILED DESCRIPTION OF PREFERRED EMBODIMENTS

Embodiments of the disclosure will be described in detail with reference to the accompanying drawings as follows.

Figure 1:
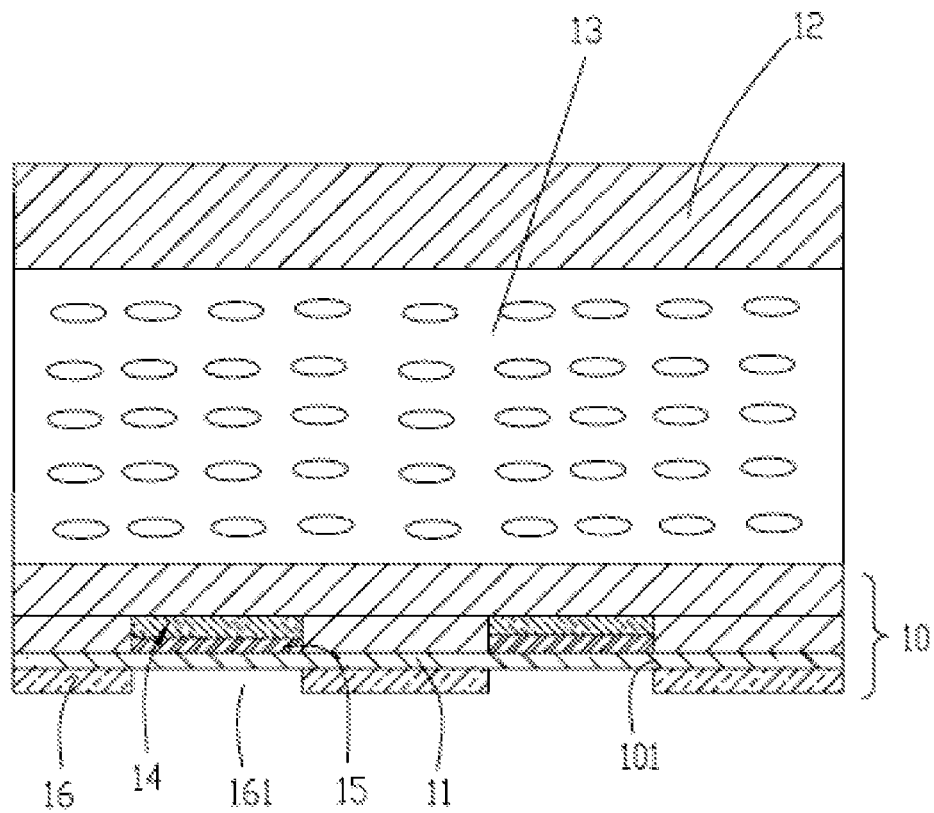
FIG. 1 is a schematic, cross-sectional view of a liquid crystal display according to a preferred embodiment of the disclosure.
Figure 2:
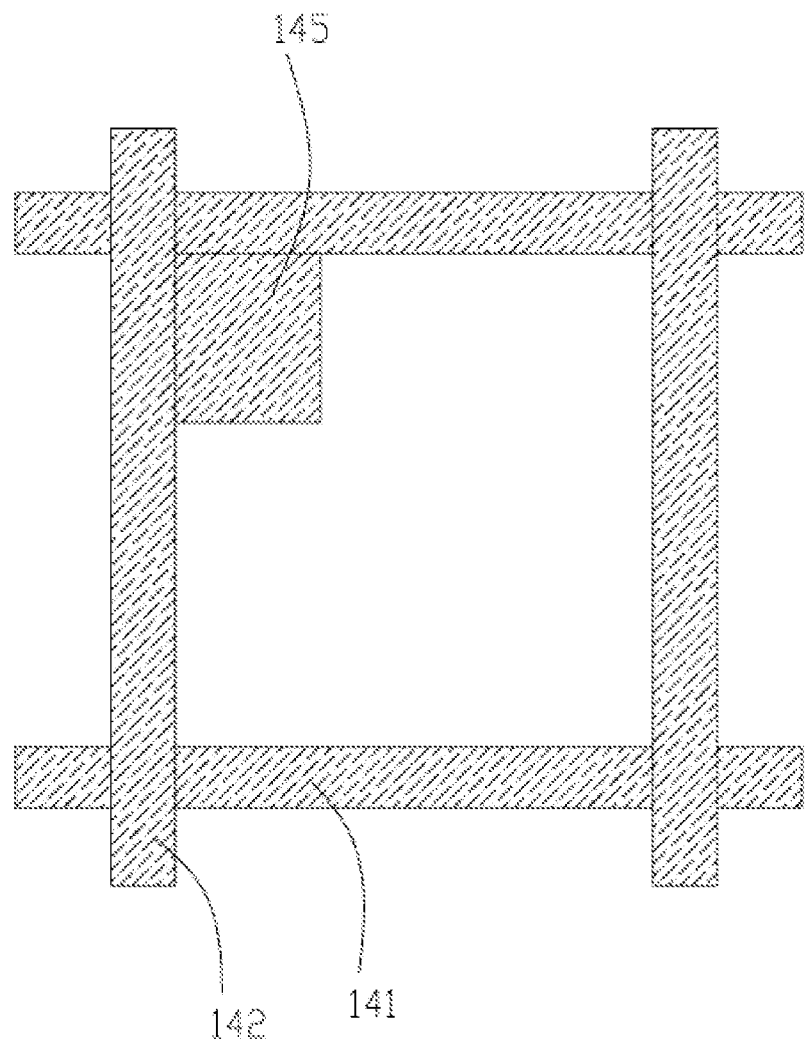
FIG. 2 is a top view of a partial structure of the liquid crystal display of FIG. 1.

Referring to FIG. 1 and FIG. 2, the application provides a liquid crystal display and a terminal, the liquid crystal display includes a liquid crystal cell, the liquid crystal cell includes a first substrate 10, a second substrate 12 and a liquid crystal layer 13 between the first substrate 10 and the second substrate 12. The first substrate 10 at least includes a transparent base 11, a metallic wiring 14 disposed on the transparent base 11 towards the liquid crystal layer 13 and a first polarizer 16 disposed on an external surface of the transparent base 11. The liquid crystal display further includes a solar cell 15 disposed on the transparent base 11 of the first substrate 10 right below the metallic wiring 14, the first polarizer 16 includes a hollow region 161 revealing the transparent base 11, the solar cell 15 shelters the hollow region 161.

The metallic wiring 14 includes one or all of a data line 141, a scanning line 142 and a pixel electrode. In the embodiment, the metallic wiring 14 includes the data line 141, the scanning line 142 and the pixel electrode. The metallic wiring 14 covers the solar cell 15.

An orthographic projection of the hollow region 161 on the transparent base 11 and an orthographic projection of the solar cell 15 on the transparent base 11 completely coincide, or the orthographic projection of the hollow region 161 on the transparent base 11 is in the orthographic projection of the solar cell on the transparent base 11. In the embodiment, a through-hole of the first polarizer 16 is defined in the first polarizer 16 by cutting a position corresponding to the solar cell 15, which is the hollow region 161, light can go through the hollow region 161 to penetrate the transparent base 11 and subsequently enter the liquid crystal cell through the transparent base 11 bypassing the metallic wiring, the optical transmittance is increased. Preferably, the orthographic projection of the hollow region 161 on the transparent base 11 and the orthographic projection of the solar cell 15 on the transparent base 11 coincide completely. Circumference of the hollow region 161 and circumference of the solar cell 15 form a gap through the transparent base 11.

When light is illuminated on a surface of the transparent base 11, the light will go through the hollow region 161 of the first polarizer 16 and penetrate the transparent base 11 as well as a gap 101 formed between the circumference of the hollow region 161 and the circumference of the solar cell 15, the solar cell 15 can collect backlight rays and convert optical energy to electric energy, which is reutilization. The electric energy converted by the solar cell 15 can be stored in a battery of a terminal such as a mobile phone or a tablet, or applied to power the backlight source and a panel signal line directly. An operational principle of the solar cell 15 is the photoelectric effect, ray radiation can be converted to be electric energy by a manner of directly converting light into electricity. The solar cell 15 is specifically a semiconductor photodiode, including a PN junction consisting of an N type semiconductor thin film and a P type semiconductor thin film, also known as a photoelectric conversion thin film, electron current can be generated when light is illuminated on the photoelectric conversion thin film. The light source can be a backlight source or sunlight.

According to the disclosure, the solar cell 15 is disposed on the first substrate 10 within a metallic wiring region, meanwhile, the section of the first polarizer 16 on the first substrate 10 directly opposite to the solar cell 15 is removed to form the hollow region 161, transmittance of light penetrating the transparent base 11 in the gap is increased significantly to reduce the power consumption, the utilization rate of optical energy and the optical efficiency are improved, power consumption of the display is reduced.

In the embodiment, the first substrate 10 further includes a storage capacitor or a thin film transistor 145 in a pixel region, a position on the transparent base 11 opposite to the thin film transistor 145 is disposed with a first solar cell (not shown in the figures), a first hollow region is disposed on the first polarizer 16 correspondingly to the first solar cell. When light is illuminated on a surface of the first substrate 10, the light will go through a first hollow region of the first polarizer 16 and penetrate the transparent base 11 as well as a gap formed between the circumference of the first hollow region and the circumference of the first solar cell, the first solar cell can collect backlight rays and convert optical energy to electric energy, which is reutilization.

In the embodiment, the first substrate 10 includes an insulation layer applied to insulate electric connection between the solar cell and other components in the liquid crystal display. The solar cell is between the insulation layer and the transparent base or in the insulation layer.

In the embodiment, the liquid crystal display further includes a frame 17, the frame 17 is between the first substrate 10 and the second substrate 12 and sealing the liquid crystal layer 13, a second solar cell (not shown in the figures) is disposed in the frame 17. The frame 17 is made out of transparent material. When light is illuminated on a surface of the frame 17, the light will enter the second solar cell through the frame 17, the second solar cell can collect backlight rays and convert optical energy to electric energy, which is reutilization.

In the embodiment, the liquid crystal display further includes a flexible circuit board connected to the liquid crystal cell, the solar cell and the flexible circuit board are connected electrically.

In the embodiment, the liquid crystal display further includes a backlight module 18, the solar cell 15 and the backlight module 18 are connected electrically. The backlight module supplies light to the liquid crystal display.

Above are preferred embodiments of the disclosure, to a person skilled in the art, any modification or improvement within the spirit and principles of the disclosure should be covered by the protected scope of the disclosure.

What is claimed is:

1. A liquid crystal display, comprising a liquid crystal cell, the liquid crystal cell comprising a first substrate, a second substrate and a liquid crystal layer between the first substrate and the second substrate, the first substrate at least comprising a transparent base, a metallic wiring disposed on the transparent base towards the liquid crystal layer and a first polarizer disposed on an external surface of the transparent base, the liquid crystal display further comprising: a solar cell disposed on the transparent base of the first substrate right below the metallic wiring, the first polarizer comprising a hollow region revealing the transparent base, an orthographic projection of the solar cell covering the hollow region.

2. The liquid crystal display according to claim 1, wherein an orthographic projection of the hollow region on the transparent base and the orthographic projection of the solar cell on the transparent base completely coincide, or the orthographic projection of the hollow region on the transparent base is in the orthographic projection of the solar cell on the transparent base.

3. The liquid crystal display according to claim 1, wherein the metallic wiring comprises a data line, a scanning line and a pixel electrode.

4. The liquid crystal display according to claim 2, wherein the metallic wiring comprises a data line, a scanning line and a pixel electrode.

5. The liquid crystal display according to claim 2, wherein the first substrate further comprises a storage capacitor or a thin film transistor in a pixel region, a position on the transparent base opposite to the thin film transistor is disposed with a first solar cell, a first hollow region is disposed on the first polarizer correspondingly to the first solar cell.

6. The liquid crystal display according to claim 1, wherein the first substrate comprises an insulation layer applied to insulate electric connection between the solar cell and other components in the liquid crystal display.

7. The liquid crystal display according to claim 1, wherein the liquid crystal display further comprises a frame, the frame is between the first substrate and the second substrate and sealing the liquid crystal layer, a second solar cell is disposed in the frame.

8. The liquid crystal display according to claim 1, wherein circumference of the hollow region and circumference of the solar cell form a gap through the transparent base.

9. The liquid crystal display according to claim 1, wherein the liquid crystal display further comprises a flexible circuit board connected to the liquid crystal cell, the solar cell and the flexible circuit board are connected electrically.

10. The liquid crystal display according to claim 1, wherein the liquid crystal display further comprises a backlight module, the solar cell and the backlight module are connected electrically.

11. A terminal, comprising a liquid crystal display, the liquid crystal display comprising a liquid crystal cell, the liquid crystal cell comprises a first substrate, a second substrate and a liquid crystal layer between the first substrate and the second substrate, the first substrate at least comprising a transparent base, a metallic wiring disposed on the transparent base towards the liquid crystal layer and a first polarizer disposed on an external surface of the transparent base, the liquid crystal display further comprising: a solar cell disposed on the transparent base of the first substrate right below the metallic wiring, the first polarizer comprising a hollow region revealing the transparent base, an orthographic projection of the solar cell covering the hollow region.

12. The terminal according to claim 11, wherein an orthographic projection of the hollow region on the transparent base and the orthographic projection of the solar cell on the transparent base completely coincide, or the orthographic projection of the hollow region on the transparent base is in the orthographic projection of the solar cell on the transparent base.

13. The terminal according to claim 11, wherein the metallic wiring comprises a data line, a scanning line and a pixel electrode.

14. The terminal according to claim 12, wherein the metallic wiring comprises a data line, a scanning line and a pixel electrode.

15. The terminal according to claim 12, wherein the first substrate further comprises a storage capacitor or a thin film transistor in a pixel region, a position on the transparent base opposite to the thin film transistor is disposed with a first solar cell, a first hollow region is disposed on the first polarizer correspondingly to the first solar cell.

16. The terminal according to claim 11, wherein the first substrate comprises an insulation layer applied to insulate electric connection between the solar cell and other components in the liquid crystal display.

17. The terminal according to claim 11, wherein the liquid crystal display further comprises a frame, the frame is between the first substrate and the second substrate and sealing the liquid crystal layer, a second solar cell is disposed in the frame.

18. The terminal according to claim 11, wherein circumference of the hollow region and circumference of the solar cell form a gap through the transparent base.

19. The terminal according to claim 11, wherein the liquid crystal display further comprises a flexible circuit board connected to the liquid crystal cell, the solar cell and the flexible circuit board are connected electrically.

20. The terminal according to claim 11, wherein the liquid crystal display further comprises a backlight module, the solar cell and the backlight module are connected electrically.

* * * * *